United States Patent [19]

Blemberg et al.

[11] Patent Number: 5,236,642
[45] Date of Patent: Aug. 17, 1993

[54] MULTIPLE LAYER SHEET MATERIALS, AND PACKAGES, AND METHODS AND APPARATUS FOR MAKING

[75] Inventors: Robert J. Blemberg, Appleton; John P. Eckstein; Kevin J. Curie, both of Neenah, all of Wis.

[73] Assignee: American National Can Company, Chicago, Ill.

[21] Appl. No.: 458,487

[22] Filed: Dec. 28, 1989

Related U.S. Application Data

[63] Continuation-in-part of Ser. No. 204,485, Jun. 9, 1988, abandoned, and Ser. No. 140,096, Dec. 31, 1987, Pat. No. 4,944,972.

[51] Int. Cl.$^5$ .............................................. B29C 47/06
[52] U.S. Cl. .................................. 264/40.7; 264/171; 425/131.1; 425/133.5; 425/462
[58] Field of Search ................. 264/171, 40.7, 173, 264/514; 425/131.1, 133.1, 133.5, 462; 156/244.11, 244.12

[56] References Cited

U.S. PATENT DOCUMENTS

| | | | |
|---|---|---|---|
| 4,436,778 | 3/1984 | Dugal | 264/515 |
| 4,476,080 | 10/1984 | Komoda et al. | |
| 4,533,510 | 8/1985 | Nissel | 425/462 |
| 4,652,325 | 3/1987 | Benge et al. | 156/244.11 |
| 4,780,258 | 10/1988 | Cloeren | 425/131.1 |
| 4,784,815 | 11/1988 | Cloeren et al. | 264/171 |
| 4,789,513 | 12/1988 | Cloeren | 425/131.1 |
| 4,804,510 | 2/1989 | Luecke et al. | 264/171 |
| 4,839,131 | 6/1989 | Cloeren | 264/171 |
| 4,842,791 | 6/1989 | Gould et al. | 264/171 |
| 4,917,851 | 4/1990 | Yamada et al. | 264/171 |
| 4,944,972 | 7/1990 | Blemberg et al. | 428/35.2 |
| 5,061,534 | 10/1991 | Blemberg et al. | 264/176.1 |

FOREIGN PATENT DOCUMENTS

| | | |
|---|---|---|
| 294214 | 12/1988 | European Pat. Off. |
| 299736 | 1/1989 | European Pat. Off. |
| 315304 | 5/1989 | European Pat. Off. |
| 323043 | 7/1989 | European Pat. Off. |
| 345987 | 12/1989 | European Pat. Off. |
| 51-10863 | 1/1976 | Japan ............................ 425/133.5 |

*Primary Examiner*—Jeffery Thurlow
*Attorney, Agent, or Firm*—Mary J. Schnurr

[57] ABSTRACT

Method, apparatus, and films, related to coextrusion of heat-sensitive polymer materials. The sensitive melt stream element (12) is encapsulated in a second polymeric melt stream element (16). Transport means (36) is preferably employed between the encapsulating means (20) and the die (42). A third melt stream element (68) is joined to one or both opposing surfaces (70) of the second melt stream element (16) between the encapsulating means (20) and the die (42). In the die (42) the encapsulated melt stream element (12) becomes an interior layer (46) between encapsulating layers (48A, 48B) derived from the second melt stream element (16). The third melt stream element (68) forms layers (72, 74) positioned outwardly of the encapsulating layers (48A, 48B). The positioning, on the interior of the extrudate, of edges (54) of layer (46) is adjusterd independently of the combined thicknesses of a layer derived from the third melt stream element (68) and an adjacent layer (48).

4 Claims, 4 Drawing Sheets

MULTIPLE LAYER SHEET MATERIALS, AND PACKAGES, AND METHODS AND APPARATUS FOR MAKING

This application is a continuation-in-part of application Ser. No. 204,485, filed Jun. 9, 1988, now abandoned and application Ser. No. 140,096, filed Dec. 31, 1987, now U.S. Pat. No. 4,944,972 both of which are incorporated herein by reference in their entireties.

BACKGROUND OF THE INVENTION

This invention relates to methods for fabricating polymeric articles, including multiple layer film, sheet materials, and packages.

As used herein, "structure" means and includes multiple layer film and packages made with the multiple layer films of the invention.

Vinylidene chloride copolymers (VDC) provide barrier to transmission of moisture vapor and oxygen, and therefore are desirable for use when those properties are important. It is commonly known that the extrusion of VDC copolymers is accompanied by a plurality of processing problems. These processing problems generally relate to the sensitivity of VDC copolymer to the combination of high temperature contact between the VDC and hot metal, and especially the amount of time for which high temperature contact is maintained during the extrusion process.

The apparatus and processes disclosed in application Ser. No. 204,485 now abandoned provide for the encapsulation of a sensitive core layer. This provides protection for the core layer (e.g. VDC copolymer), effective to attenuate the problem of VDC copolymer degradation, in the multiple layer film so produced. But the edge portions of the films are devoid of core layer. That is, the edges of the encapsulated layer do not extend into the normal edge portions of the film (e.g. about 1-2 inches on each side) which are typically trimmed off of a cast extruded film, extruded from a slot die. So the trim cutters must be set inwardly from the extruded edge of the film, further than normal, to ensure that the trimmed edges include the core layer. As a result, there is more than the usual amount of waste edge trim.

The core layer can be extended to within normal trim width, by reducing the flow rate of the encapsulating layer. However, if this is done, the encapsulating layer does not assuredly protect the opposing non-edge/elongate surfaces of the sensitive core layer in the slot die, although the core layer may still be protected in the transport pipe and in a feedblock between the encapsulator and the die.

It is an object of this invention to provide novel articles and processes, with the versatility of being able to control and position the location of the edge of an encapsulated core layer, preferably of heat sensitive material, relative to the outer edge of the sheet, while independently controlling the thickness of covering polymer materials on the opposing surfaces of the encapsulated layer.

It is a further object of this invention to achieve the preceding objective by coordinating the flow rate of an additional melt stream, from an additional extruder, with the flow rate of the encapsulating melt stream.

It is another object to reduce, or otherwise control, the edge trim of a coextruded film comprising a layer of a VDC copolymer.

It is still another object to accomplish the control of the edge trim and coordination of the flow rates while reducing the need for use of more costly specialized polymer compositions.

SUMMARY OF THE DISCLOSURE

In this invention, the flow rate of the encapsulating melt stream is reduced, compared to the flow rate in Ser. No. 07/140,096, now U.S. Pat. No. 4,944,972. The core layer is protected in the die by the reduced-thickness encapsulating layer elements, and by "additional" layer elements, which are preferably thin, on outer surfaces of the encapsulating layer element, in such a manner that the additional layer elements do not encompass the opposing edges of the film. The combination of the encapsulating layer elements and the "additional" layer elements, operate together such that their combined thicknesses function protectively as a single layer in protecting the core layer. Since the flow rate of the encapsulating layer elements directly adjacent the core layer is reduced, the edges of the core layer extend within the normal edge trim width.

Accordingly, this invention includes a first family of coextruded multiple layer films having two opposing outer surfaces and a thickness therebetween. The films comprise a first interior layer typically comprising a vinylidene chloride copolymer, and having first and second opposing surfaces. Second and third generally continuous polymeric layer elements, are adapted to adhere to the first layer, on each of, respectively, the first and second surfaces of the first layer. The second and third layer elements have outwardly disposed surfaces, facing away from the first layer. Fourth and fifth layer elements are positioned respectively on each of the outwardly disposed surfaces of the second and third layer elements. The thicknesses of each of the fourth and fifth layer elements comprise less than 10%, preferably less than 6%, more preferably less than 4%, of the thickness of the film between the two opposing surfaces. The invention holds enhanced value in embodiments wherein the thickness, between the two opposing outer surfaces, is no more than 10 mils.

This invention includes a second family of coextruded multiple layer films having two opposing outer surfaces and a thickness therebetween. These films comprise a first interior layer having a first and second opposing surface. A second generally continuous polymeric layer element has first and second opposing surfaces. The first surface of the second layer element is disposed in surface-to-surface contact with the first surface of the first layer. A third polymeric layer element is disposed on the second surface of the second layer element. A fourth layer element corresponding to the second layer element and having first and second opposing surfaces is in surface-to-surface contact with the second surface of the first layer. The thickness of the combination of the second and third layer elements is less than 10% preferably between 5% and about 7.5%, of the thickness between the opposing outer surfaces. The thickness between the opposing outer surfaces is preferably no more than about 10 mils, more preferably no more than about 5 mils, most preferably no more than about 3 mils.

Preferably, the composition of the first/interior layer, in this second family, comprises a vinylidene chloride copolymer, and the film includes a fifth layer element which is on the second surface of the fourth layer element. The combined thicknesses of the second, third, fourth, and fifth layer elements in the film comprise less than about 20% preferably less than about 15%, of the thickness between the two opposing outer surfaces.

This invention further comprehends a third family of coextruded multiple layer films having two opposing outer surfaces and a thickness therebetween. In the third family, there are five layers as in the preferred embodiment of the second family. However, the thickness of each, the second layer element and the next adjacent layer element opposite the first layer, are not more than 0.1 mil.

The invention yet further comprehends a fourth family of coextruded multiple layer films In the fourth family, the films comprise a first interior layer having a pair of opposing edges, and opposing first and second surfaces between the edges, second and third generally continuous polymeric layer elements positioned respectively on the first and second surfaces of the first layer, and a fourth layer element on a surface of the second layer element, opposite the first layer. In this family, each film has outer edges, and a pair of edge portions. Each such edge portion has a width thereof extending between one edge of the first layer and the corresponding one of the outer edges of the film. The ratio of the average widths of the edge portions to the combined thicknesses of the second and fourth layer elements is no more than about 25000/1, preferably no more than about 10,000/1.

The above families of films overlap each other, while each such family comprehends its own distinct identity.

In preferred embodiments of the films, including preferred embodiments of all the above families, the first layer is completely encapsulated by the adjacent layer elements on either side of it, which extend around the first layer, and meet at its edges.

It is further preferred that respective components of the outwardly disposed surfaces of the combination of the layer elements on opposing surfaces of the first layer define the outer edges of the film as extruded from the die, those layer elements thereby defining the end portions between the outer edges of the film and the edges of the first layer.

The films of the invention are preferably fabricated by the steps of (i) supplying a combined polymeric melt stream, having a first melt stream core element comprising a first polymeric composition, encapsulated within a second melt stream outer element comprising a second polymeric composition; (ii) deforming the combined melt stream to a form comprising a pair of edges, first and second opposing surfaces between the edges, the first core element being disposed inwardly of the opposing surfaces and inwardly of the pair of edges; (iii) joining a third polymeric melt stream element to the opposing first surface, to form a composite polymeric melt stream comprising the first, second, and third melt stream elements; (iv) extruding the composite melt stream out of a slot die, and thereby fabricating the film; and (v) quenching the film, such that the ratio of the width of one of the edge portions to the combined thicknesses of the second and fourth elements, as extruded from the die, is no more than about 25000/1.

Preferably the method, of fabricating the films of the invention, includes the step of controlling the widths of the edge portions independent of the combined thicknesses of the second and fourth layer elements, by cooperatively setting the second and third flow rates such that the second flow rate controls the widths of the edge portions and such that the third flow rate controls the combined thicknesses of said second and fourth layer elements, between one of the elongate surfaces of the film and the core layer, in light of the second flow rate, whereby (i) the widths of the edge portions and (ii) the combined thicknesses of the second and fourth layer elements are so separately controlled by the cooperative setting of the second and third flow rates.

The method preferably includes controlling the positioning of all melt streams used in the extruding of the film such that the edge portions consist essentially of material derived from the second melt stream element.

Still further, the invention contemplates polymer fabricating apparatus. The apparatus comprises means for plasticating a first polymeric composition and producing a first polymeric melt stream, a die for molding a polymeric melt stream, means, between the plasticating means and the die, for encapsulating the first polymeric melt stream in a second polymeric melt stream, to thereby form a combined polymeric melt stream, and a feedblock between the plasticating means and the die. The feedblock is adapted to join two or more polymeric melt streams in surface-to-surface relationship, wherein each such melt stream has a pair of opposing edges at opposing terminal edges of the combination of the joined melt streams, and wherein the terminal edges of the combination of the joined melt streams are defined by corresponding edges of each of the two or more polymeric melt streams.

Finally, the invention contemplates packages, including, by way of example, trays, containers, pouches, lid stock, and the like, made with coextruded films or sheets of the invention, with coextruded films or sheets made with the methods of the invention, and with coextruded films or sheets made with the apparatus of the invention.

DETAILED DESCRIPTION OF THE ILLUSTRATED EMBODIMENTS

As used herein, a melted polymeric stream coming from an individual extruder is referred to as a "melt stream element." The combinations of two or more melt streams are referred to as "melt streams".

Figure 1:
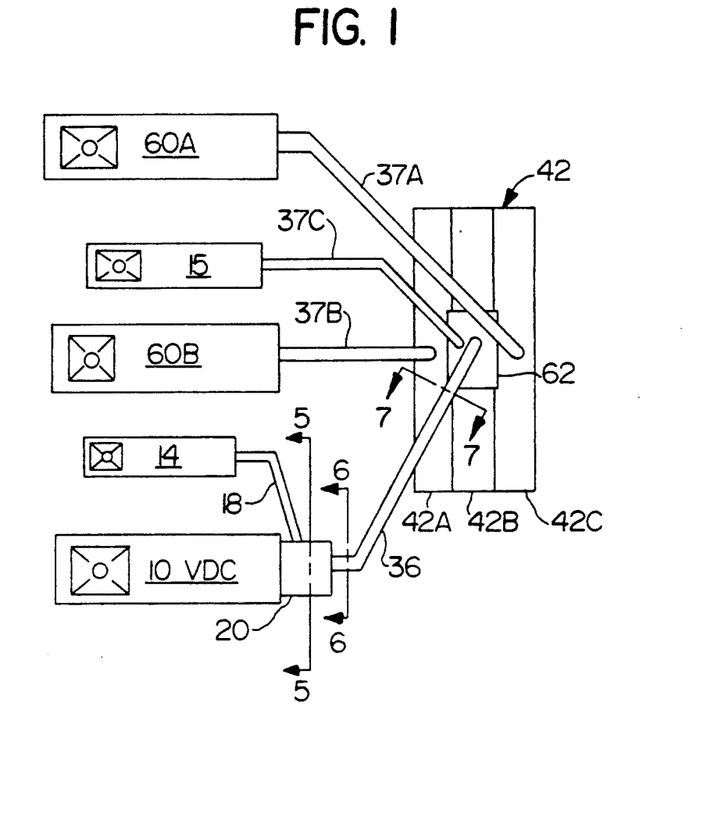
FIG. 1 shows a top view of a layout of extrusion equipment used in this invention.

Referring to FIG. 1, a first extruder 10 plasticates a representative first polymeric composition which is sensitive to being degraded by the processing conditions. Typical such polymeric compositions contain a vinylidene chloride copolymer such as vinylidene chloride vinyl chloride copolymer or vinylidene chloride methyl acrylate copolymer. Extruder 10 thus produces a first polymeric melt stream element 12, seen in FIG. 3. A second extruder 14 plasticates a second polymeric composition and produces a second polymeric melt stream element 16 and delivers it, through a connecting conduit 18, to an encapsulator 20 which is mounted to first extruder 10 by means of a flange 21 (FIG. 3) and appropriate connectors, such as bolts (not shown). Encapsulator 20 feeds transport pipe 36, which connects the encapsulator 20 with feedblock 62. Feedblock 62 feeds die 42. Die 42 has three segments 42A, 42B, and 42C. Feedblock 62 is shown feeding center die segment 42B.

Extruders 60A and 60B feed the two outer segments 42A and 42C of multi-manifold die 42 through transport pipes 37A and 37B respectively. Extruder 15 feeds the second inlet port on feedblock 62 through transport pipe 37C.

Figure 3:
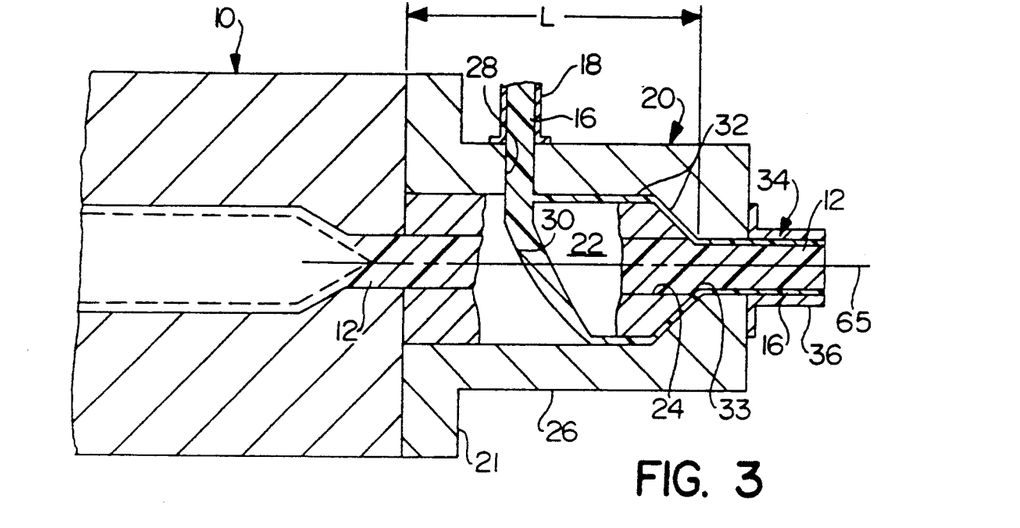
FIG. 3 shows an enlarged cross-section, from the top as in FIG. 1, of the encapsulator area.
Figure 4:
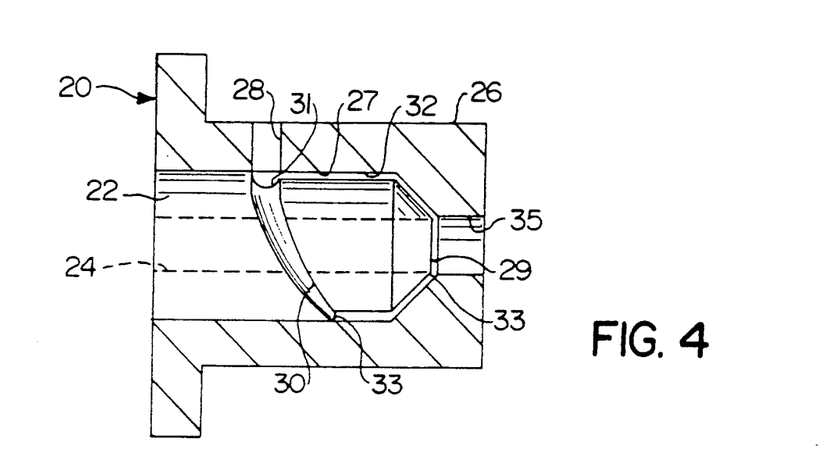
FIG. 4 shows a top view of the encapsulator, including a cross-section of the sleeve to show the mandrel.

Referring now to FIGS. 3 and 4, encapsulator 20 comprises a crosshead mandrel 22 having a central bore 24 which receives first melt stream element 12 from first extruder 10. Encapsulator 20 further comprises a sleeve 26 surrounding mandrel 22. Sleeve 26 has an inlet passage 28 for passage of the second polymeric melt stream element 16 into the encapsulator 20. Passage 28 leads to a crosshead groove 30 preferably having a tapering cross-section about the circumference of mandrel 22. With the cooperation of the inner surface 27 of sleeve 26, groove 30 distributes polymer melt stream element 16 about the circumference of mandrel 22 and between mandrel 22 and inner surface 27. Annular channel 32, between the outer surface of mandrel 22 and the inner surface 27 of sleeve 26, extends from groove 30 to the end 29 of mandrel 22, defining an annular upstream portion of channel 32 disposed toward groove 30 and a frustoconical downstream portion disposed toward end 29. The width of channel 32, between mandrel 22 and sleeve 26, approaches a constant with respect to its circumference at any given transverse cross-section of the encapsulator, such as the cross-section shown in FIG. 5.

Channel 32 ends at a joinder 33, where channel 32 joins with central bore 24 at the end 29 of mandrel 22. Channel 32 delivers second polymer melt stream element 16 to the joinder 33 in an annular configuration having a generally uniform thickness about its circumference, as controlled by the circumferentially uniform distance across channel 32 between mandrel 22 and sleeve 26.

Figure 5:
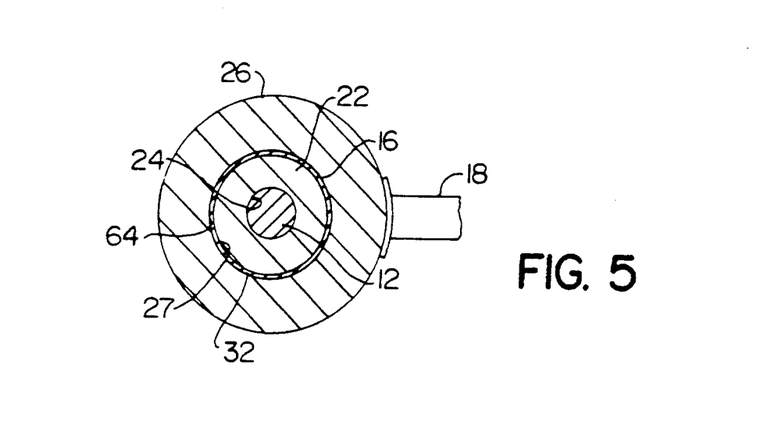
FIG. 5 shows a transverse cross-section of the encapsulator, taken along 5—5 of FIG. 1.

As melt stream element 16 enters crosshead groove 30, its splits, at groove entrance 31, near the top of FIG. 4, into two components and flows around mandrel 22 in radially opposite directions. The leading edge portions of those stream components meet on the opposite side 33 of crosshead groove 30, (near the bottom of FIG. 4) opposite from passage 28, and thereby forming weld line 64 in melt stream element 16. Weld line 64 is seen in FIG. 5. While weld line 64 has only moderate effect on the functional properties of film 44, in those embodiments where the film is trimmed, it is usually preferred that weld line 64 be omitted from that portion of the film which it is anticipated will be used. Thus, in mounting encapsulator 20 to extruder 10, the encapsulator is preferably oriented such that the weld line 64 passes through die 42 in such a position that it can readily be trimmed off by edge trim cutters, in a process subsequent to fabrication of the film article 44 (e.g., FIGS. 8 and 9).

With both melt stream elements 12 and 16 being supplied by their respective extruders 10 and 14 in constant flows of the melt stream elements, melt stream element 12 is thus surrounded by, or encapsulated in, melt stream element 16 at joinder 33. Consequently, a combined melt stream 34 is formed from melt stream elements 12 and 16, wherein the second melt stream element 16 forms a continuous layer about the circumference of, and positioned outwardly of, the first melt stream element 12. Thus, the first and second melt stream elements 12 and 16 maintain their individual identities, and first melt stream element 12 is completely surrounded by, and encapsulated in, the second melt stream element 16. The combined melt stream 34 exits encapsulator 20 and enters a transport means which is shown in the illustrated embodiment as transport pipe 36.

It is desirable that the encapsulating second melt stream element 16 have a uniform thickness about the circumference of the combined melt stream 34 for reasons which will be explained more fully hereinafter.

Melt stream element 16 has a uniform thickness as delivered to the joinder 33. However, as the combined melt stream 34 leaves joinder 33, the interface between melt stream elements 12 and 16 seeks out its own circumferential location according to the dynamic fluid pressures in melt stream elements 12 and 16. The initial cross-section profile of the interface as it leaves joinder 33 depends on a plurality of contributing factors. Such factors include the shape and contour of crosshead groove 30, and of annular channel 32, the particular polymer compositions, the melt flow rates of melt stream elements 12 and 16, and the thermal processing histories of the polymers being used. Especially the melt flow rate of melt stream element 16 can vary about the circumference of channel 32 at joinder 33.

An encapsulator, and especially encapsulator elements groove 30 and channel 32, and central bore 24 might be designed for each different polymer and each different process to be used for each polymer. Thus, the desired parameters, and especially uniformity of the thickness of melt stream element 16 about the circumference of combined melt stream 34, might be controlled through encapsulator design. However, even if such an encapsulator were designed for a particular set of conditions, any change in the conditions could require designing and building another encapsulator. To the extent flexibility, for example in processing and in polymer selection, is desired, the time and cost of providing the plurality of encapsulators to meet such needs would negatively impact efficient operation of the process.

Thus, while it is desired that melt stream element 16 have a uniform thickness about the circumference of combined melt stream 34, it is also desired that a single encapsulator 20 be useful for operations with a variety of polymers and a variety of processes. Also, the operator should have a reasonable degree of freedom in the operation of both extruders 10 and 14, in order to provide an efficient operation.

Figure 6A:
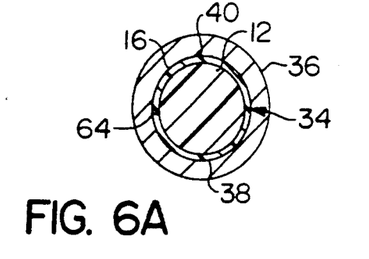
FIG. 6A, 6B, and 6C are taken at 6—6 of FIG. 1, and show exaggerated examples of non-concentricity in the combined polymeric melt stream as it leaves the encapsulator.
Figure 6B:
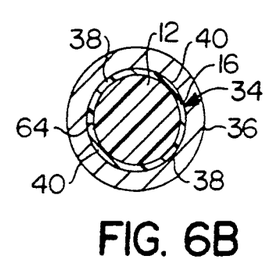
Figure 6C:
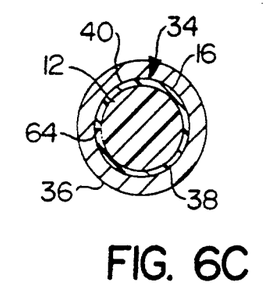

As the operator makes processing adjustments, whether by, for example, change of polymers or change of processing conditions with respect to melt stream element 16, the rheology of the resulting melt stream element 16 can change, especially the distribution of the flow rates about the circumference of channel 32 at any given transverse cross-section. When the rheology changes, so does the uniformity of flow of melt stream element 16 change about the circumference of mandrel 22. Accordingly, the flow rates of melt stream element 16 can differ about the circumference of mandrel 22. These differences can manifest themselves as different thicknesses about the circumference of combined melt stream 34 as the combined melt stream leaves encapsulator 20 and enters transport pipe 36, even though a constant thickness is desired; and even though a constant clearance is provided between mandrel 22 and sleeve 26 in channel 32. FIGS. 6A, 6B, and 6C illustrate three types of differences of thickness of the elements of combined melt stream 34 which may be encountered downstream of joinder 33 and along the upstream portions of transport pipe 36.

In FIGS. 6A and 6C, first melt stream element 12 is generally circular in cross-section, but is off-centered in pipe 36, such that the corresponding second melt stream element 16 has a thinner portion generally designated 38 and a thicker portion generally designated 40, at opposing locations on the circumference. In FIG. 6B, the first melt stream element is centered in pipe 36, but is ovoid rather than circular. Correspondingly, the associate melt stream element 16 has two thinner portions 38 and two thicker portions 40. Other illustrations of non-uniformity can, of course, be developed.

Figure 7:
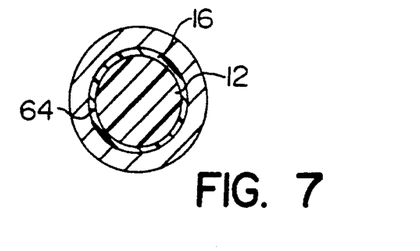
FIG. 7 is taken along 7—7 of FIG. 1, and illustrates the achievement of concentricity in the combined polymeric melt stream in the sufficiently long transfer pipe.

Conventional fluid flow mechanics indicates that the distribution of the polymer melt stream element 16 in the fabricated film 44 is representative of, or reflects, the distribution of the thickness of melt stream element 16 as it enters the die 42. Thus, in order to obtain the same thicknesses in the layers 48A and 48B, which are derived from melt stream element 16, it is important that the top and bottom portions of the outer encapsulating melt stream element 16, of the combined melt stream 34, have the same thicknesses as shown in FIG. 7, when the combined melt stream enters feedblock 62. A film or sheet made with, for example, the combined melt stream shown in FIG. 6A would have a thicker top layer 48A and a relatively thinner bottom layer 48B. In a film made with the melt stream of FIG. 6B, the top layer 48A would taper from thicker to thinner transversely across the film from right to left with respect to the direction seen in FIG. 8. Correspondingly, the bottom layer 48B would taper in the opposite direction.

In a film made with the combined melt stream of FIG. 6C, the widths of the opposing edge portions 50 would be different; and the top and bottom layers would have different thicknesses, both of which would vary transversely across the film.

Figure 2:
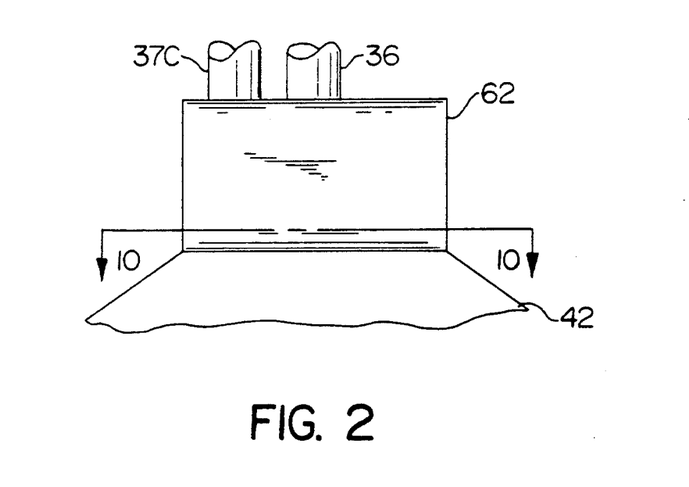
FIG. 2 shows a side view of the feedblock of FIG. 1, its feed pipes, and a fragment of the die.

It has unexpectedly been found that variations in the thickness of encapsulating melt stream element 16 can be reduced when the viscosity of melt stream element 16 at the conditions of operation is less than the viscosity of melt stream element 12, by at least about 20 percent, preferably at least about 30 percent. This applies to any pair of polymeric materials which can be extrusion processed at melt stream temperatures within about 5° C. (9° F.) of each other. The method of measuring viscosity is not particularly critical, so long as the same method is used for all measurements.

Where the viscosities of the melt stream elements 12 and 16 are accordingly different, variations in the thickness of melt stream element 16 are reduced by passing the combined melt stream through a transport conductor having a symmetrical cross-section and a sufficient length. For example, a round pipe having an inside diameter of about 16 mm. (about 0.63 inch) and length of about 107 cm. (about 42 inches) is suitable for so processing an encapsulated melt stream comprising a core of vinylidene chloride methyl acrylate copolymer as melt stream element 12 and an encapsulating ethylene vinyl acetate copolymer having 28% vinyl acetate as melt stream element 16. A typical transport conductor is the round transfer pipe 36 shown in FIGS. 1-3. Other shapes are acceptable, for addressing variations in thickness of melt stream element 16, so long as they are symmetrical.

Given the viscosity differences required, the length of the transport conductor which is needed to effect the desired reduction in thickness variations is further a function of the cross-section of the transport conductor, both its shape and its size. For a round pipe as seen at 36 in FIG. 1, the required length is a function of the diameter, and can be expressed as a ratio of the length to the diameter (L/D ratio). Some improvement in concentricity is seen, particularly for the materials of most interest as disclosed herein, in round pipes having an L/D ratio as small as 4/1; preferred ratios are at least 10/1, while most preferred ratios are at least 20/1. Effective lengths and corresponding effective or equivalent cross-sections, and therefore effective or equivalent L/D ratios, can now be determined for other conductor shapes by routine investigation.

Variations of at least about 10%, preferably at least about 20%, in the thickness of melt stream element 16 about the circumference of the combined melt stream 34 at the upstream end of the pipe 36, adjacent encapsulator 20, can be reduced, before entering die 42, by at least 50%, preferably at least 75%, most preferably at least 90% in magnitude, from the thickest portion of melt stream element 16 to the thinnest portion. The outer surfaces of melt stream elements 12 and 16 thus approach a common outline shape at different distances from a common center. Variations can potentially be reduced up to nearly 100% with round pipes. In preferred configurations, the layer surfaces are concentric, as seen in FIG. 7.

To the extent the shape of the transport conductor deviates from circular, a lesser reduction in thickness variations may be achieved, namely less than the most preferred 90%, due to conventional boundary layer flow phenomena. The potential for reduction in thickness variations when using non-round pipes is less than 100%, and varies with each cross-sectional shape. The severity of the initial variation of the thicknesses about melt stream element 16, and the cross-sectional shape of the transport conductor, will, combined, determine the fractional reduction of the thickness variation which can potentially be achieved. An effective ratio of length to interior diameter is one which brings the melt stream elements into a concentric, or nearly concentric, relationship, and where the thickness of melt stream element 16 approaches an optimum, about the circumference of the melt stream.

Since the transport means can bring the melt stream elements into a concentric, or nearly concentric, and at least substantially symmetric, relationship, then concentricity, symmetry, or circumferential uniformity at the output of the encapsulator, which is difficult to achieve is no longer important. Rather, encapsulation of the sensitive VDC copolymer in an encapsulator 20 mounted to the extruder 10 enables the use of the transport means in order to achieve uniformity of distribution of melt stream element 16 about the combined melt stream 34, without the typical VDC degradation. Thus the combination of (i) the early encapsulation in an encapsulator mounted to the extruder and (ii) use of the elongated transport means after encapsulation, tends to automatically correct any asymmetry, non-concentricity or other non-uniformity which may exist in the combined melt stream 34 as it leaves encapsulator 20, without incurring rapid degradation of VDC copolymer in melt stream element 12.

The combination of encapsulator followed by elongated transport means automatically accommodates processing changes and polymer changes, so long as the preferred viscosity relationships are observed. The longer the transport means, the greater its versatility in accommodating change. However, the polymer melt streams are typically rather viscous at the nominally conventional operating temperatures in pipe 36. So L/D ratios as for a transport pipe generally do not exceed about 100/1 or the equivalent, for these viscous materials.

The transport means automatically corrects deficiencies in non-uniformity of the combined melt stream, as found at the output of encapsulator 20, within the capability provided by its length and symmetry, more or less independent of the processing conditions and the polymer compositions. The transport means is thus a means for providing improved uniformity of thickness of melt stream element 16 about the circumference of the combined melt stream, and preferably improved concentricity, when the transport means is a round pipe, before the combined melt stream (encapsule) 34 enters the die 42.

Another advantage of using the transport means, for example transfer pipe 36, is that it allows feeding of combined melt stream 34 into any segment (e.g. 42A, 42B, or 42C) of a multi-manifold die such as die 42. Segments 42A and 42C are fed directly by transport pipes 37A and 37B. Segment 42B is fed by feedblock 62 which is fed by transport pipes 36 and 37C.

Figure 8:
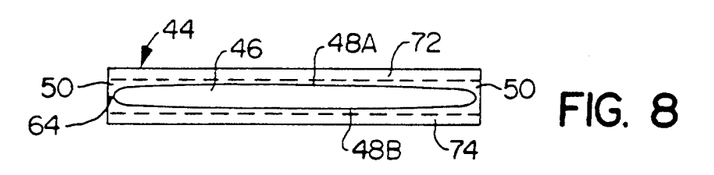
FIG. 8 shows a cross-section of a 5-layer film of the invention.
Figure 9:
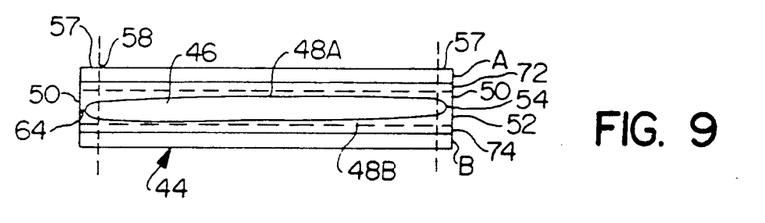
FIG. 9 shows a cross-section of a 7-layer film of the invention.

The encapsulation used in this invention is especially useful in the extrusion of polymers which are sensitive to exposure to metal at the high temperatures which are used in extrusion processing. For example, vinylidene chloride copolymers are sensitive to exposure to temperatures of as little as 290° F. (143° C.) to 320° F., (160° C.), especially when the copolymer is concurrently exposed to the heated metal surfaces of the processing apparatus which is at a similar elevated temperature. In order to produce a film having consistent and predictable properties, it is important that layer elements 48 (e.g. 48A and 48B) be continuous and have a generally uniform thickness both longitudinally along the length of the film, and transversely across the width of the film, recognizing that the thicknesses of layer elements 48A and 48B increase somewhat near the edges 54 of core layer 46, or otherwise stated, as edge portions 50 are approached, and as illustrated in FIGS. 8 and 9. The widths of the two edge portions 50 are defined to extend from the outer edges 52 of the film to the corresponding edges 54 of core layer 46. They should be about equal, and should be constant along the length of the film, so that cutters can be set to reliably cut away trim portions 57 of a reasonable, preferably substantially equal, width while reliably and reproducibly generating a generally endless film which is typically wound on one or more cores to make rolls of the film. Trim portions 57 extend from outer edges 52 to the trimmed edges 58, designated with dashed lines in FIG. 9. A reasonable width for trim portions 57 is of the order of 1 to 2 inches.

The film does have ends associated with starting and stopping of the operation. The film does have different structure and composition at its starting and stopping ends. The compositions and structures at the starting and stopping ends will be ignored for purposes of illustrating this invention. The core layer 46 extends to both edges 58 of the trimmed film. The trim portions 57 include edge portions 50 of the film as well as side edge portions of core layer 46 inwardly of edges 52. Thus, a side edge portion 57 is defined as extending from side edges 54 toward the longitudinal axis of the film along the center of the film. Edge trim portions 57 include associated components of the other layers, in addition to layer 46 and layer elements 48A and 48B all as illustrated in FIG. 9.

The thicknesses of layer elements 48, as seen in FIGS. 8 and 9, depend upon the amount of material in the encapsulating melt stream 16, as well as its uniformity of distribution. Thus the thicknesses of layer elements 48, relative to layer 46, can be increased, or decreased by adjusting the relative flow rate of melt stream element 16. However, as the flow rate of melt stream element 16 is increased relative to the flow rate of melt stream element 12, some of the additional material of melt stream element 16 flows to edge portions 50, such that the edge portions 50 of the film being produced at die 42 become wider, whereby the corresponding edges 54 of the core layer 46, in the film being produced, become more removed from the outer edges 52 of the film being extruded from the die. As the edges 54 of core layer 46 become more removed from the outer edges 52 of the film, at the die outlet, the cutters cutting trim portions 57 are accordingly moved approximately the same distance and direction, in order that the cutters continue to cut through the film at locations that contain core layer 46.

The economics of the operation indicate that the width of the edge trim should be no more than the normal edge trim which is typically taken on films produced with slot dies. At the same time, it is important to protect sensitive melt stream element 12 from significant contact with the metal surfaces of the processing apparatus as done in encapsulator 20 and transport pipe 36. It is similarly important to protect melt stream element 12 from significant contact with the surfaces of feedblock 62 and die 42.

Figure 10:
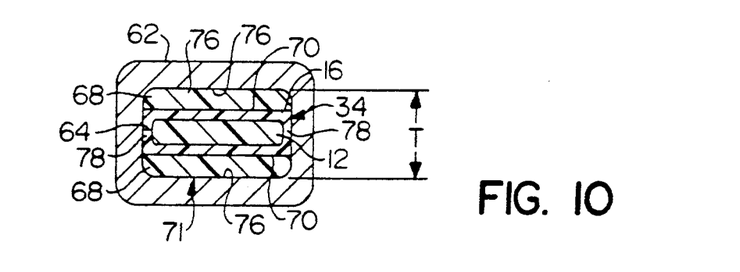
FIG. 10 shows a representative cross-section of melt streams in the feedblock and is taken along line 10—10 of FIG. 2.

In feedblock 62 (shown in FIGS. 1 and 10), the illustrated annular combined melt stream 34 (shown, for example, at FIG. 7) is converted to a rectangular shape, and the third melt stream element 68 from extruder 15 is joined to an outer surface 70 of melt stream element 16. Preferably, melt stream element 68 is joined to both outer surfaces 70 of melt stream element 16, as seen in FIG. 10. The composite melt stream 71, containing melt stream elements 12, 16 and 68, can be forced through a single layer slot die (not shown) in fabrication of a three layer film illustrated in FIG. 8. The first layer is core layer 46, from melt stream element 12. The second layer comprises layer elements 48B and 72 from melt stream elements 16 and 68 respectively. The third layer comprises layer elements 48B and 74 from melt stream elements 16 and 68 respectively. Where the feedblock is employed with a three manifold slot die, as in FIG. 1, and where extruders 60A and 60B are employed to provide melt streams to the die, a five layer film is produced wherein layers designated A and B are disposed on outer surfaces of layer elements 72 and 74, away from layer elements 48A and 48B as seen in FIG. 9.

Figure 11:
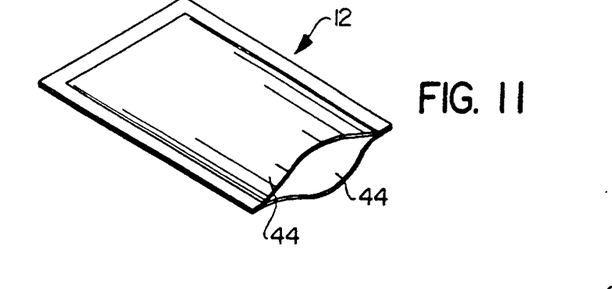
FIG. 11 is a pictorial view of a pouch made with flexible sheet material made according to the invention.

As shown in FIG. 11, the combined thicknesses of melt stream elements 16 and 68 are interposed between the opposing elongated surfaces of melt stream element 12 and the corresponding elongated inner surfaces 76 of the feedblock 62.

As the composite melt stream 71, comprising stream elements 12, 16, and 68, passes from the feedblock, into and through the slot die (FIGS. 1 and 13), the elongated surfaces (FIG. 10) of the cross-section of the composite melt stream 71 are further elongated, while the thickness "T" of the composite melt stream, between the elongated surfaces, is reduced. As the composite melt stream 71 is thus shaped/deformed, the thicknesses of the respective layers are accordingly reduced, while the edge portions 78 of melt stream element 16, which protect the ends of melt stream element 12, are also reduced in thickness, and are elongated between the side edges of melt stream element 12 and the inner edge surfaces of the feedblock and the die.

As the elongation of the cross-section of the combined melt streams takes place in the die in converting from the cross-section feedblock 62 (e.g. FIG. 10) to the cross-section of the sheet material (FIGS. 8-9), the thicknesses of the precursors of especially layer elements 48A and 48B, which are being formed, and become so thin, as they traverse the die, that their ability to protect the precursor of layer 46, as it is being formed from melt stream element 12 in the die, may be jeopardized. Further, where the precursors of layer elements 48A and 48B are so thin, this affects their ability to function as adhesives between layer 46 and another layer, for example layers A or B of FIG. 9. Accordingly, a given flow rate of melt stream element 16 can be fully adequate to protect melt stream element 12 in transport pipe 36, but inadequate to protect the precursor of layer 46 in the die. Increasing the flow rate of melt stream element 16 could provide the desired protection of the precursor of layer 46 in the die, but would increase the edge trim unacceptably.

The flow rate of melt stream element 16 is preferably set, and adjusted as necessary, to provide at least that minimum amount of melt stream element 16 which is required for protecting melt stream element 12, by encapsulation, through transport pipe 36 and into feedblock 62; but less than that amount of melt stream element 16 which would require taking more than the normal 1-2 inches of edge trim in order to obtain a film in which the core layer extends to the edge of the trimmed film. The flow rate of melt stream element 16 is set and/or adjusted, relative to the flow rate of melt stream element 12, such that both objectives of protectively encapsulating melt stream element 12 in transport pipe 36, and controlling the edge trim requirement, are met. Such a flow rate typically does not provide effective protection for melt stream element 12 in the die. The range of acceptable flow rates for melt stream element 16 varies with the setting of the other processing parameters, as well as with the selection of the several polymers used in making the several layers and layer elements of the film. The desired flow rate of melt stream element 16 is set by checking the width of the edge portions 50, and adjusting the flow rate of melt stream 16 accordingly.

The widths of the edge portions 50 are controlled, independent of the combined thicknesses of the second and fourth layer elements, by cooperatively setting the flow rates of melt streams 16 and 68 such that the flow rate of melt stream 16 controls the widths of the edge portion 50 and the flow rate of melt stream 68 controls the combined thicknesses of the layers so generated, namely, the layer comprised of layer elements 48A and 72, and the layer comprised of layer elements 48B and 74.

Accordingly, once the desired flow rate has been established for melt stream 16, such that the widths of edge portions 50 are within the desired tolerances, then the flow rate of melt stream 68 is set so as to obtain the desired thickness of the combination of the layer elements derived from melt streams 16 and 68. Namely, rather than using only melt stream 16 to obtain the necessary minimum thickness of polymeric material, adjacent layer 46, to achieve the purpose of adjacent layer, the thickness is achieved through the combination of melt streams 16 and 68, whereby the widths of the edge portions are controlled by the flow rate of melt stream 16, and the thicknesses of the combinations of the layer elements, along the elongate surfaces of the film, are controlled by the flow rate of melt stream 68. When the flow rates of melt streams 16 and 68 are so controlled, for film 0.05-0.50 mm. (2-20 mils) thick, and given that the desired thickness of the combination of layers 48A and 72 typically range from about 0.0025-0.025 mm. (about 0.1-1 mil), then the ratio of the width of the corresponding edge portion 50 to the thickness of the combination of layers 48A and 72, and corresponding layers 48B and 74, is normally no more than about 25,000/1. A range of typical ratios is about 1000/1 to about 20,000/1. The ratio preferably is in the range of about 2000/1 to about 15,000/1, with a target range being about 10,000/1.

Since achievement of the protective function of melt stream element 16 alone in the die can be uncertain as regards (e.g. layers 48A and 48B), it is advantageous that melt stream element 68 is joined with melt stream elements 12 and 16 in the feedblock 62 in a configuration as generally represented in FIG. 10. Generally melt stream element 68 is joined to the outer surfaces 70 of the combined melt stream 34, whereby melt stream element 68 is imposed between outer surfaces 70 and the corresponding adjacent portions of inner surfaces 76 of the feedblock.

Melt stream 68 does not extend in any significant thickness around edge portions 78 in the feedblock. A functionally insignificant amount of melt stream element 68 may, however, spread around edge portions 78 as the composite melt stream traverses through the feedblock and the die.

It is acceptable, in some embodiments, for layer elements 72 and 74 to be thick enough to be considered layers in and of themselves. Such thickness is typically at least about 0.1 mil. However, the compositions preferably selected for layer elements 72, 74 are typically comparatively costly. Accordingly, where additional thickness of the film is desired, and wherein layers A and/or B are not desirably increased in thickness, an additional layer (not shown) of a less costly material is interposed between layer 72 and layer A. A similar additional layer can optionally be interposed between layer 74 and layer B. Typical compositions for such layers are the polyethylenes, prolypropylene, and EVA having VA content less than about 15 weight percent.

It is not necessary that the composite 71 of melt streams 34 and 68 be converted to rectangular shape in feedblock 62. It can have other shapes, as desired. Melt streams 34 and 68 can, for example, be combined in layered relationship, to make the composite melt stream 71, in a feedblock or combining adapter wherein the main flow channel for the composite melt stream is circular, and wherein the composite melt stream is circular when delivered to the die. This is convenient in that conventional dies usually have circular inlets. Thus the invention is acceptable for use with dies commonly in use, whereby a conventional die is acceptable for practice of the instant invention.

"Edge trim" as referred to herein means the average of the trim taken at each of the two edge portions of the film, in ensuring the presence of the core layer 46 at both trimmed edges. It is contemplated that there can be minor variations between the widths of the two edge portions and longitudinally in the film along each of the edge portions.

By proper selection of the composition of melt stream element 68, layer elements 72 and 74 can perform a variety of desired functions. For example, a composition can be selected for melt stream element 16 according to its advantageous properties of forming strong bonds with the adjacent layer derived from the composition for melt stream element 12. When melt stream element 12 comprises a VDC, an advantageous composition for melt stream element 16 is an EVA, especially an EVA containing from greater than 9 weight percent VA up to about 28 percent VA. As the VA content is increased, the level of adhesion is increased. The extended period of contact between melt stream elements 12 and 16 in transport pipe 36, which corresponds with the above recited L/D ratio, enhances the development of bonds across the interface between melt stream elements 12 and 16.

In the preferred embodiments of this invention, primary value is in the use, in combination, of layer elements 48A/48B and 72/74, each of which by itself, is unable to satisfy the characteristics desired for both the product and the process. Melt stream element 16, which is the precursor of layer elements 48A and 48B, provides encapsulation of the sensitive melt stream element 12 and spacial separation of melt stream element 12 from the equipment surfaces, up to the feedblock 62. But it is too thin to assuredly provide spacial separation in the die. It is also too thin to assure adequate adhesion in some embodiments.

Melt stream 68, on the other hand, intentionally does not provide the encapsulation of melt stream element 12, whereby it is deficient for use by itself. It does provide the necessary layer thickness, in feedblock 62, to assure that the melt stream element 12 is spaciously separated and protected in the die. The additional thickness also enhances the adhesion to melt stream element 12 as it becomes layer 46 in the extruded film. The enhancement in adhesion is particularly obtained where melt stream elements 16 and 68 have compositions which enhance each other's ability to adhere to melt stream element 12.

In preferred embodiments, layer elements 48A and 48B are so thin as to be defective for the protective and adhesive functions if used without the support of respective layer elements 72 and 74. Similarly, layer elements 72 and 74 are defective for the protective encapsulating functions if used without layer elements 48A and 48B. When layer elements 72 and 74 are quite thin, e.g. less than about 0.07 mil, they are also too thin to provide adequate levels of adhesion to layer 46. But adhesion is adequate when e.g. a thin layer element 72 is combined with a thin layer element 48A.

Functionally, then, the layer elements in each of the pairs 48A, 72, and 48B, 74 cooperate with each other such that each of the pairs of layer elements operate like an individual layer. In those embodiments, where the compositions of melt streams 16 and 68 are the same, the layer elements in each pair are hardly distinguishable from each other, if at all. Where the layer elements differ somewhat (e.g. VA content in EVA), the composite layer which represents a pair of layer elements, has different properties at its two surfaces which represent generally the properties of the respective layer elements. However, the layer does operate generally, in terms of adhesion to and protection of layer 46, as a single layer.

It is well known that a minimum thickness of a bonding layer affects the strength of the bonding function. In a film which is about 0.08 mm. (3 mils) thick, for example, a bonding layer is desirably at least about 3%, preferably at least about 5% of the thickness of the film.

However, the maximum thicknesses of layers 48A and 48B which can be obtained without increasing the edge trim requirement, above that conventionally practiced outside the scope of this invention, are generally limited to no more than about 2%, sometimes less than 1% of the overall thickness of the film. For example, while a typical thickness of about 0.004 mm. (0.15 mil) may be desired for a bonding layer in a film about 0.08mm (3 mils) thick, the maximum thickness achievable without increasing the edge trim requirement beyond the conventional 1 to 2 inches (25 to 51 mm.), is about 0.0015 mm. (0.06 mil), namely about 2%, to about 0.0022 mm. (0.09 mil), namely about 3%, of the film thickness.

By controlling the mass flow rate of melt stream 16 such that edge portions 50 are controlled within the desired parameters, layer elements 48A and 48B are necessarily thin, typically no more than about 2%-3% of the thickness of the film. While such thin layers would conventionally be considered deficient in thickness, same is accepted herein for achievement of the desired edge trim objectives, while being compensated for by the supplementing and reinforcing properties of corresponding layer elements 72 and 74 which are derived from melt stream 68. Thus it is important that layer elements 48A and 48B be kept thin, with the overall thickness of the combinations of (i) layer elements 48A and 72 and (ii) 48B and 74, being dependent on the flow rates of the precursors of layer elements 72 and 74 (e.g. melt stream element 68) rather than the flow rates of the precursors of layer elements 48A and 48B (melt stream element 16).

So a desirable function of layer elements 72 and 74, in preferred embodiments, is enhancement of adhesion to layer 46, whereby, for example, layer elements 48A and 72 cooperate, in combination, to make an effective adhesive layer for bonding to layer 46 at the interface of layer element 46 and layer element 48A. This works quite effectively when the compositions of melt stream elements 16 and 68 contain the same base polymer or copolymer, for example, ethylene vinyl acetate copolymer, with or without modification of one or both layers, for example to enhance adhesion. With respect to enhanced adhesion between layers, reference is made to commonly owned and concurrently filed U.S. application Ser. No. 07/458,484.

Where layer elements work together in combination to provide the necessary level of adhesion, layer element 48A (or 48B) acts somewhat like a primer in that it enhances the adhesion developed by another layer (72 or 74). But it acts like an adhesive polymeric layer in that, unlike a primer, it has the potential to provide all of the necessary adhesion if it were used in large enough amounts (thick enough).

In some embodiments, the bonding at the interface of layer element 48A and layer 46 is sufficiently developed, and the stress anticipated to be placed on that bond is sufficiently low, that the bond can function adequately without particularly defined assistance from layer element 72.

The polymer composition selected for melt stream element 16 can readily be one which is typically coextrudable, with good adhesion, adjacent the polymer composition selected for melt stream element 12, but which is not normally regarded, or promoted, as a coextrusion adhesive. For example, the composition of melt stream element 16 can comprise an EVA having a lower VA content, within the range of VA contents available, e.g. no greater than about 15%, such as 7%-12% VA; alternatively an LDPE, or similar material, rather than, for example, one of the known carboxy modified coextrusion adhesive polymers The recognized adhesive polymers are acceptable, and are preferred. FIG. 8 shows the simplest embodiment of the use of melt stream element 68, for film about 0.08 mm. (3 mils) thick. Layer element 72 is outside of layer element 46 and layer element 48A.

In FIG. 9, layer elements 72 and 74 are interposed between layer elements 48A and 48B and respective layers A and B. In the case where the compositions of layer elements 48A and 48B can bond acceptably well to the compositions of both layer 46 and the respective layers A and B, then any deficiency in the bonding function of the 3-layer core structure of layer 46, layer element 48A, and layer element 48B, to layers A and B, which is caused by the thinness of layer elements 48A and 48B, can readily be rectified by the selection, for layer elements 72 and 74 (melt stream element 68), of a composition which is similar to the composition of layer elements 48A and 48B. Thus, for example, where the composition of layer elements 48A and 48B is an EVA, and EVA can bond well to layers A and B, then an acceptable composition for melt stream element 68 is an EVA. Polymers having minor variations from the composition of melt stream element 16, such as vinyl acetate content, melt index, and molecular weight distribution can be selected for melt stream element 68, to enhance adhesion of layer elements 72 and 74 (derived from melt stream element 68) to layers A and B.

In some embodiments, the compositions selected for layer elements 72 and/or 74 are typically selected and used for purposes other than as adhesives or as coextrusion adhesive polymers For example, an EVA having a low VA content no greater than 12 weight percent, such as 7 to 9 weight percent, may be selected Other examples of non-adhesive materials useful in layer elements 72 and 74 include LDPE, MDPE, and ionomer.

"Adhesive" and "adhesive polymers" are defined herein as materials which are typically selected (for use between two other layers) because their compositions have aggressive bonding properties, and which, in the absence of aggressive bonding properties, would not be selected Typically, such materials are known in the trade as adhesives, and are called adhesives or adhesive polymers by their manufacturers. Typical of such materials are those sold under the tradenames PLEXAR, BYNEL, ADMER, NOVATEC, CXA, and the like.

Additionally ethylene methyl acrylate is defined as an adhesive; as in ethylene vinyl acetate having at least 12% by weight vinyl acetate. Preferred EVA adhesives contain at least 18% by weight VA, preferably at least 22% VA, and most preferably at least 26% VA.

Where the composition of layer elements 48A and 48B does not bond well o the compositions of layers A and B, but does bond well to layer 46, then the compositions of layer elements 72 and 74 are preferably not the same as layer elements 48A and 48B. Rather, the compositions of layer elements 72 and 74 are selected for their ability to bond well to layers A and B, as well as to corresponding ones of layer elements 48A and 48B. For example, if layer elements 48A and 48B are EVA, then carboxy modified EVA might be selected for layer elements 72 and 74, or an EVA having a high VA content might be selected. Or, if layer elements 48A and 48B comprise a carboxy modified olefin, then a different carboxy modified olefin might be selected for layer elements 72 and 74. The selection of compositions for melt stream elements 16 and 68 for adhesiveness will typically be made according to the compositions selected for layer 46, layer A, and layer B.

As seen above, the compositions of layers A and B are processed through different extruders 60A and 60B, and thus their compositions can be the same, or they can be different. For example, layer A can comprise a more heat tolerant composition such as polypropylene, while layer B can comprise a heat seal composition such as polyethylene, or an olefin copolymer. In those embodiments where layers A and B are different, then the compositions of the adjacent bonding layer elements, namely 72 adjacent layer A, or 74 adjacent layer B, may accordingly be different from each other in order that each bonding layer element serve its intended function of bonding to the respective layer A or B. Accordingly, layer elements 72 and 74 can differ from each other, in which case an alternate feedblock is used in place of feedblock 62. The alternate feedblock has an additional inlet port to receive the required additional melt stream from the required additional extruder. In those embodiments, the flow rate of the additional melt stream is controlled, relative to melt stream 16, the same as the flow rate of melt stream 68 is controlled.

It should be noted with respect to FIGS. 8 and 9 that the thicknesses of the several sheet materials, as depicted, are exaggerated relative to their widths, so that the individual layers might be visually illustrated. Thus typical sheet materials exiting the die will be at least about 60 cm. (24 inches) wide, up to about 250-380 cm. (about 100-150 inches) wide. Typical overall thicknesses are of the order of about 0.05-0.5 mm. (2-20 mils) thick, preferably about 0.08 mm. (3 mils) to about 0.25 mm. (10 mils), most preferably about 0.08 mm. (3 mils) to about 0.15 mm. (about 6 mils).

With respect to FIG. 9, the compositions of the outer layers A and B can be selected with substantial freedom, so long as they are compatible with concurrent extrusion from a common die with the rest of the layers, and so long as adequate bonding is developed between the several layers to achieve a unitary sheet material. Exemplary (but not limiting) of compositions which can be used in outer layers are the polyamides, polycarbonates, polyester, copolyester, Selar PET, polypropylene, propylene ethylene copolymer, combinations of polypropylene with ethylene vinyl acetate copolymer, linear low density polyethylene, linear medium density polyethylene, linear high density polyethylene, low density polyethylene, medium density polyethylene, high density polyethylene, ethylene vinyl alcohol copolymer, ethylene vinyl acetate copolymer, ionomer, ultra low density polyethylene and blends of the above polymers and copolymers.

VDC copolymers are normally processed at about 150° C. to about 160° C. while others of the aforementioned polymers are typically processed at higher temperatures. With respect to VDC copolymers, and ways for making multilayer structures of the same or of heat sensitive polymers, reference is made to commonly owned and concurrently filed U.S. applications, Ser. Nos. 07/458,485, 07/458,486, 07/458,483 and each or which being hereby incorporated herein by reference.

The VDC layer is chemically shielded by less reactive coverings such as layer elements 48A, 48B, 72 and 74 by the time it enters the die, preferably before it enters the die, such as at a feedblock as illustrated at 62 (FIGS. 1 and 10).

The length "L" of encapsulator 20 from the locus of entrance of melt stream 12 to joinder 33 affects the amount of time during which the VDC copolymer is exposed to hot metal surfaces. Accordingly, length "L" is desirably short, for example less than about 61 cm. (24 inches), preferably less than about 30 cm. (12 inches). However, the length "L" must be long enough to perform the encapsulating function. The frustoconical design of encapsulator 20 is not critical. So the length "L" can be shortened considerably to, for example, 4–5 inches. For the preferred frustoconical design shown in FIGS. 2 and 3, a preferred, and typical dimension for "L" is about 8 to 10 inches (20 to 25 cm.).

Figure 13:
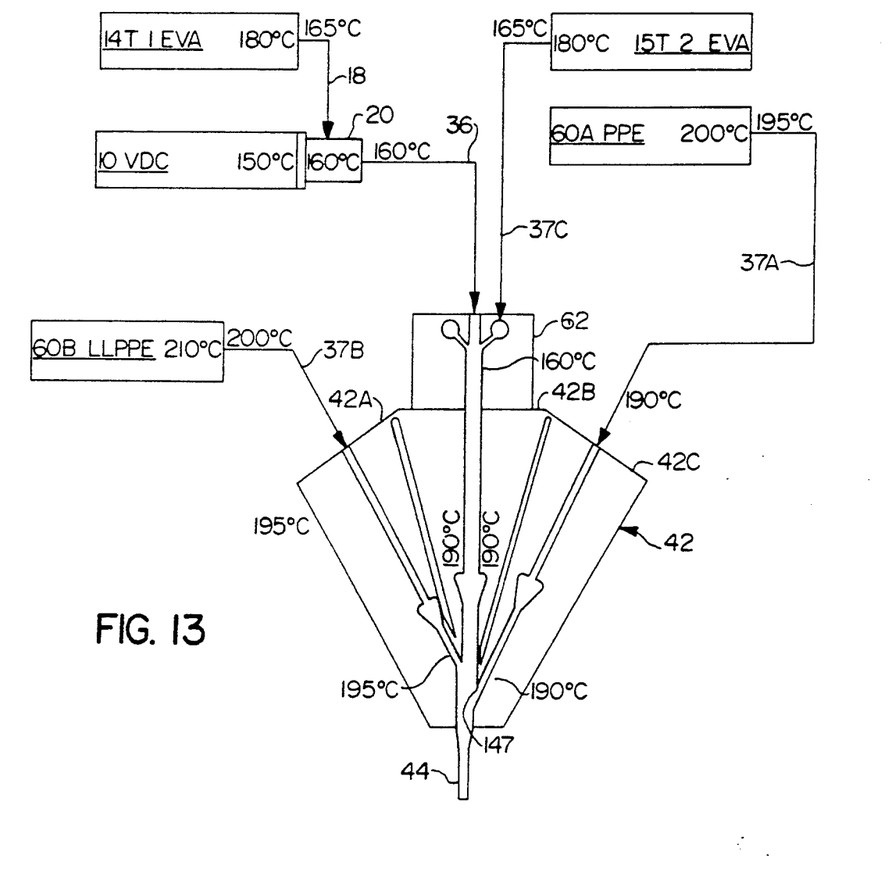
FIG. 13 illustrates typical melt stream temperatures in the several parts of the system, and shows typical cross-section of the die.

FIG. 13 diagrammatically illustrates a typical system arrangement, as in FIG. 1, of extruders, feedblocks, and die, and illustrative system temperatures. Die 42 in FIG. 13 is depicted in cross-section, with no cross-hatching and only minimal structural detail. Thus the temperatures indicated are more readily visualized. The remainder of the system is illustrated diagrammatically. The feedblock 62 is used with the center die segment 42B as in FIG. 1. Five extruders are distinguished by suffix acronyms which indicate the materials being processed in the illustrated system. The suffixes are provided by way of example only.

FIG. 13 illustrates a system arrangement wherein a VDC copolymers can be coextruded with other polymers without the normal amount of accompanying degradation of the VDC copolymer. Where the materials are to be coextruded together, as illustrated in FIG. 13, then the temperatures of the melt streams, which are to be adjacent to each other in the coextruded film, are adjusted such that their melt flow properties are compatible with producing an acceptable flow rate profile at, and subsequent to, the joinder of the respective layers. This achievement of compatible melt rheology between pairs of polymer melt streams is accomplished within the thermal parameters acceptable for extrusion processing of each of the corresponding polymer compositions.

Continuing now with reference to FIG. 13, extruder 10VDC feeds directly into encapsulator 20. Extruder 14T1EVA processes a polymeric tie, or adhesive, material which is readily coextrusible with VDC copolymer, and which adheres well to VDC copolymer, for example an EVA or adhesively modified EVA, of which several are known in the art such as the PLEXARS and BYNELS. Extruder 14T1EVA transfers its melt stream to encapsulator 20 through transfer pipe 18.

Extruder 15T2EVA processes a polymeric material, preferably a tie or adhesive composition, which adheres well to melt stream element 16 and to the PPE, to make melt stream 68. Exemplary materials are EVA and adhesively modified EVA. Extruder 15T2EVA transfers its melt stream 68 to feedblock 62 through transfer pipe 37C.

Melt streams 34 and 68 are combined in feedblock 62 to make composite melt stream 71. Composite melt stream 71 is fed from feedblock 62 to the inlet of die segment 42B.

Extruder 60BLLDPE processes linear low density polyethylene (LLDPE) and transfers its melt stream to die segment 42A through transfer pipe 37B. Extruder 60APPE transfers its melt stream to die segment 42C through transfer pipe 37A.

The die is generally maintained at about 190° C. It is closer to about 195° C. near the incoming LLDPE melt stream. Heat controllers maintain the bulk of the balance of the die at about 190° C., which is above the typical VDC processing temperature of about 160° C. But the VDC copolymer can tolerate some higher temperature in the die because of being protected by covering precursors of layer elements 48A and 48B derived from melt stream 16, and precursor of layer elements 72 and 74 derived from melt stream 68, as applied in encapsulator 20 and feedblock 62, and as seen at FIGS. 2, and 6–9.

The viscosity of melt stream 12 should remain above the viscosity of melt stream 16 at any given longitudinal location in pipe 36. For example, melt stream 12 can be a VDC and can enter encapsulator 20 at a temperature of 155° C., and have a viscosity of $2.7 \times 10^4$ poise at a shear rate of 10 sec. $^{-1}$. Melt stream 16 can be an EVA which can enter encapsulator 20 at 170° C., and have a viscosity of $1.7 \times 10^4$ poise at a shear rate of 10 sec. $^{-1}$ and a temperature of 170° C.

As the combined/encapsulated melt stream progresses along pipe 36, melt stream element 16 is cooled. At a temperature of 155° C., which is equal to the above temperature of melt stream element 12 at the encapsulator, the viscosity of the melt stream element 16 is $2.1 \times 10^4$ poise at 10 sec. $^{-1}$. Accordingly, even if the temperatures of the two melt stream elements 12 and 16 reach equilibrium, the viscosity of melt stream element 12 remains greater than the viscosity of melt stream element 16.

The film as fabricated according to the process illustrated in FIG. 13 is as illustrated in FIG. 9, when layer B represents the LLDPE layer. Layer elements 48A and 48B represent two TIE layers. Layer 46 represents VDC. Layer A represents the PPE. And layer elements 72 and 74 are derived from melt stream 68 produced by extruder 15T2EVA.

In forming a package with a film or sheet of the invention, seals are typically made by driving heat through the sheet material, from one surface to the other (e.g. from one of layers A and B, to the other). In the exemplary embodiment of FIG. 9, layer A is PPE and layer B is LLDPE. In this embodiment, the surface layer B of LLDPE softens and forms heat seals at a lower temperature than will the surface layer A of PPE. Therefore, in making a package with that film, the B layer is preferably disposed inwardly of the sensitive layer 46, and inwardly of the package. The A layer is preferably disposed outwardly of the sensitive layer 46, and outwardly of the package. Which surface layer (e.g. A or B) is disposed inwardly, and which is disposed outwardly, usually depends on the relative softening temperatures of the two outer layers A and B, in a selected embodiment, especially as regards formation of heat seals in the formation of the package. While the B layer LLDPE polymer is disposed inwardly of the package in the above illustrated embodiment wherein layer A is PPE, the LLDPE layer B can be disposed on the outside of the package when the A layer is of a composition (e.g. SURLYN ionomer from Du Pont) having a lower softening temperature than the LLDPE. With respect to sealant blends, reference is hereby made to commonly owned and concurrently filed U.S. application Ser. No. 07/458,489 which is hereby incorporated herein by reference.

Other coextrudable combinations of compositions, in addition to those already recited, will now be obvious to those skilled in the art, and all such obvious combinations are contemplated herein Referring to FIG. 1, the polymer melt stream extruded from the die, as from die 42, or the like, is typically quenched on a chill roll, not shown, in conventionally known manner between the die and the trimming operation. Any functional quenching process is, however, acceptable. The extruded melt stream can be extensibly drawn between the die and the quenching process according to conventional practice, as known, for example, for cast extrusion processes, whereby the linear speed of the chill roll exceeds the linear speed of travel of the melt stream as it exits the die. With reference to the chill roll end temperatures therefore, attention is directed to commonly owned and concurrently filed U.S. application Ser. No. 07/458,484 which has been incorporated herein by reference.

Figure 12:
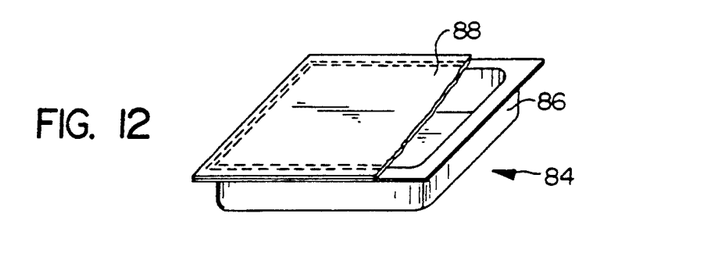
FIG. 12 is a pictorial view, with parts cut away, of a package of the invention, comprising a tray and a covering lid.

The wide variety of films and sheet materials contemplated in this invention can readily be fabricated into various types of packages by processes which can conventionally be used for fabricating the sheet materials into packages. An example of such a package is pouch 83 seen in FIG. 11, which is comprised of facing portions of sheet material 44 made according to the invention and heat sealed to each other about contiguous portions thereof to make a pouch closed on three sides and open on the fourth side to receive a product. The fourth side can be sealed to close the package, e.g. after reception of the product. Another example is package 84 seen in FIG. 12, which illustrates a thermoformed tray 86, which can be made with thicker sheet material of the invention, having a lid 88 which can be made with e.g. thinner sheet material of the invention. Either the tray 86 or the lid 88 can represent sheet material of the invention separately, without its counterpart representing the invention.

"Sheet material" as used herein includes films, wherein all layers comprise polymeric composition, and which are 20 mils (0.5 mm) or less in thickness, as well as structures which are thicker than 20 mils and/or which include non-polymeric layers such as paper or metal foil.

The following non-limiting examples are given by way of illustration only and are not to be considered limitations of this invention, many apparent variations of which are possible without departing from the spirit or scope thereof.

EXAMPLE 1

A combined melt stream is fabricated comprising a core layer of VDC-MA and outer layers of ethylene vinyl acetate copolymer (EVA) containing 28 weight percent vinyl acetate. The VDC-MA and EVA are plasticated in respective first and second extruders. The VDC-MA is Dow MA 119 Saran, containing 1% epoxidized soy bean oil, and having a viscosity at 150° C. and shear rate of 10 sec. $^{-1}$ of about $2.7 \times 10^4$ poise. The EVA is LD-761 from Exxon Company, and has a viscosity of about $1.7 \times 10^4$ poise at 170° C. and shear rate of 10 sec $^{-1}$. The temperature at the outlet of the first extruder (VDC-MA) is 158° C. The temperature at the outlet of the second extruder (EVA) is 170° C. The first melt stream of VDC-MA is fed through the central bore of a crosshead encapsulator, as disclosed herein, mounted to the exit end of its extruder. The second melt stream of EVA is fed to the crosshead mandrel of the encapsulator and joined to the first melt stream, as an outward, encapsulating layer, to make the combined melt stream as seen at 34 in FIG. 3. The feed location in the crosshead mandrel is positioned such that the weld line is in the edge trim. The combined melt stream is fed from the encapsulator through a 16 mm. (about 0.63 inch) inside diameter round pipe about 107 cm. (about 42 inches) long, into the central channel of a feedblock. The feedblock is mounted on a single layer slot die. The feedblock has two inlet ports and is configured for a three-layer exit stream. A third melt stream of polypropylene homopolymer is fed into the second inlet port of the feedblock and is positioned on both sides of the combined encapsulated melt stream by way of the outer feedblock channels. The several melt streams are expressed through the slot die to form a film. The resulting film is about 0.08 mm. (3 mils) thick. The outer polypropylene layers are each about 30% of the thickness. The VDC-MA is about 30% of the thickness. The encapsulating EVA layers represent the balance of the thickness of the film at about 5% each. Edge trim of about 5 cm. (about 2 inches) is taken on each side adjacent the edge of the VDC layer. Each of the trimmed edges contain the VDC-MA.

EXAMPLE 2

A film is fabricated as in EXAMPLE 1 wherein the third melt stream comprises a propylene ethylene copolymer having 3.5% weight ethylene.

EXAMPLE 3

A film is fabricated as in EXAMPLE 1 using a three-manifold slot die. The feedblock is mounted to the center manifold. The combined melt stream of VDC-MA and EVA is fed to the central channel of the feedblock. Third and fourth (polypropylene) melt streams are generated by two separate extruders and are fed to the two outer die manifolds. A fifth melt stream comprising an anhydride modified EVA (Plexar 3 from Quantum Chemical Company, Chemplex Division, Rolling Meadows, Illinois) is fed into the second inlet port of the feedblock and is positioned on both sides of the combined encapsulated melt stream, of VDC-MA and EVA, by way of the outer feedblock channels.

The flow rate of the second melt stream (EVA) is adjusted so that the VDC-MA comes to within 0.75 inch (1.9 cm.) of the edge of the film so fabricated. The flow rate of the fifth melt stream is adjusted so that the combined thicknesses of the second and fifth melt streams are each about 5% of the thickness of the film on each side of the VDC layer. The resulting film is about 0.08 mm. (3 mils) thick. The outer polypropylene layers are each about 30% of the thickness. The VDC-MA is about 30% of the thickness. The composite of each of the pairs of layer elements, namely layer elements 48A (EVA) and 72 (modified EVA), and layer elements 48B (EVA) and 74 (modified EVA), represent the balance of the thickness of the film at about 5% each. The layer elements 48A and 48B are each about 0.002 mm. (about 0.08 mil) thick, whereby the layer elements 72 and 74 are also each about 0.002 mm. (about 0.08 mil) thick. Edge trim of about 3.2 cm. (about 1.25 inches) is taken on each side adjacent the edge of the VDC layer. Each of the trimmed edges contains the VDC-MA.

EXAMPLE 4

A film is fabricated as in EXAMPLE 3 wherein the third and fourth melt streams comprise propylene ethylene copolymer having 5% weight ethylene.

EXAMPLE 5

A combined melt stream comprising a core layer of vinylidene chloride methyl acrylate copolymer (VDC-MA) and outer layers of ethylene methyl acrylate (EMA) is fabricated. A first polymeric composition comprising vinylidene chloride methyl acrylate copolymer is plasticated in a first extruder to form a first polymeric melt stream. A second composition of the EMA is plasticated in a second extruder to form a second polymeric melt stream. The vinylidene chloride methyl acrylate copolymer is Dow MA 119 Saran, containing 1% epoxidized soy bean oil. Methyl acrylate content of the EMA is 20 weight percent. The temperature at the outlet of the first (VDC-MA) extruder is 153° C. The temperature at the outlet of second (EMA) extruder is 180° C. The first melt stream of vinylidene chloride copolymer is fed through the central bore of a crosshead encapsulator, as disclosed herein, mounted to the exit end of its extruder. The second melt stream of EMA is fed to the crosshead mandrel of the encapsulator and joined to the first melt stream, as an outward, encapsulating layer, to make the combined melt stream as seen at 34 in FIG. 3. The feed location in the crosshead mandrel is positioned such that the weld line is in the edge trim. The combined melt stream is fed from the encapsulator through a 16 mm. (about 0.63 inch) inside diameter round pipe about 107 cm. (about 42 inches) long, into the central channel of a feedblock mounted on a three layer die as in FIG. 1. The feedblock has two inlet ports and is configured for a three-layers exit stream. A third melt stream of EMA (methyl acrylate content 20 weight percent) is fed into the second inlet port of the feedblock and is positioned on both sides of the combined encapsulate melt stream by way of the outer feedblock channels. Melt streams for fabricating outer layers A and B comprise polypropylene, and are fed to the outer die segments, as at 43A and 43C of FIG. 1. The several melt streams are expressed through the slot die to form a film. The resulting film is about 0.08 mm. (about 3 mils) thick. The outer polypropylene layers are each 30% of the thickness. The vinylidene chloride methyl acrylate copolymer is about 30% of the thickness. The composite layers corresponding to each of the pairs of layer elements 48A and 72, and 48B and 74, represent the balance of the thickness of the film at about 5% each. The layer elements 48A and 48B are each about 0.002 mm. (about 0.08 mil) thick, whereby the layer elements 72 and 74 are each about 0.002 mm. (about 0.08 mil) thick. Edge trim of about 5 cm. (about 2 inches) is taken on each side adjacent the edge of the VDC layer. Each of the trimmed edges contains the VDC-MA.

EXAMPLE 6

A seven layer film is fabricated as in EXAMPLE 5 except that the flow rate of the encapsulating second (EMA) melt stream is reduced until the edge trim can be reduced to about 3 cm. (about 1.25 inch) and still contain the VDC copolymer. Accordingly, the flow rate of the third melt stream (EMA) is increased enough to maintain the same total thickness of about 0.004 mm. (about 0.15 mil) for the combination of layer elements 48A and 72, and also the combination of layer elements 48B and 74.

EXAMPLE 7

A seven layer film is fabricated as in EXAMPLE 6 except that the compositions of the A and B layers comprise linear low density polyethylene copolymer, and the second and third melt streams comprise EVA having vinyl acetate content of 28 weight percent.

EXAMPLE 8

A seven layer film is fabricated as in EXAMPLE 7 except that the A layer is a polypropylene and the B layer is an ionomer. Layer element 72 is an anhydride modified polypropylene. Layer element 74 is an EVA.

Clearly other examples are now obvious, and it will be seen that other layers can be incorporated into the films and sheet materials of the invention in order to obtain other desired properties. And while up to 7 layers have been illustrated, the invention can be adapted to films and sheet materials having 4 or more layers, preferably 5 or more. Additional layers can be added, typically through the conventional use of additional feedblocks mounted to, for example, a three layer die such as die 42.

The invention provides novel films, sheet materials, and processes, providing the versatility of being able to control and position the location of the edge of an encapsulated core layer while independently assuring sufficient thickness of an effectively adjacent polymer material on the opposing surfaces of the encapsulated core layer.

Further, the invention provides means for supporting, and enhancing the adhesion of, a thin encapsulating layer.

Those skilled in the art will now see that certain modifications can be made to the apparatus and methods, and the resulting films, sheet materials, and packages, herein disclosed with respect to the preferred embodiments, without departing from the spirit of the instant invention.

And while the invention has been described above with respect to its preferred embodiments, it will be understood that the invention is capable of numerous rearrangements, modifications, and alterations, and all such arrangements, modifications, and alterations are intended to be within the scope of the appended claims.

Having thus described the invention, what is claimed is:

1. A method of processing polymers, comprising:
   (a) supplying a combined polymeric melt stream, having a first melt stream core element comprising a first polymeric composition, encapsulated within a second melt stream outer element comprising a second polymeric composition;
   (b) deforming said combined melt stream to a form comprising a pair of edges, and first and second opposing surfaces between said edges, said first core element being disposed inwardly of said opposing surfaces and inwardly of said pair of edges;
   (c) feeding the deformed combined melt stream to a transport conductor;
   (d) joining a third polymeric melt stream element to said first opposing surface, to form a composite polymeric melt stream comprising said first, second, and third melt steam elements;
   (e) extruding said composite melt stream out of a slot die, thereby fabricating a film having a pair of terminal edges, and two opposing elongate surfaces between said edges, said film comprising a first interior layer derived from said first melt stream core element and extending to layer edges disposed inwardly of said terminal edges, between second and third layer elements derived from said second melt stream element, and a fourth layer element derived from said third melt stream element, on said second layer element; and
   (f) quenching said film, said film, as extruded out of said slot die, comprising edge portions having widths extending between said terminal edges and corresponding ones of said edges of said first layer, said edge portions being devoid of said first layer, the ratio of the width of one of said edge portions to the combined thicknesses of said second and fourth layer elements being no more than about 25000/1.

2. A method of processing polymers, comprising:
   (a) supplying a combined polymeric melt stream, having a first melt stream core element comprising a first polymeric composition, encapsulated within a second melt stream outer element comprising a second polymeric composition;
   (b) deforming said combined melt stream to a form comprising a pair of edges, and first and second opposing surfaces between said pair of edges, said first core element being disposed inwardly of said opposing surfaces and inwardly of said pair of edges;
   (c) feeding the deformed combined melt stream to a transport conductor;
   (d) joining fourth and fifth layer elements, from a third melt stream element to said first and second opposing surfaces, to form a composite polymer melt stream comprising said first, second, and third melt stream elements;
   (e) extruding said composite melt stream out a slot die, and thereby fabricating a film having a pair of terminal edges, and two opposing elongate surfaces between said edges, said film comprising a first interior layer derived from said first melt stream core element and extending to layer edges disposed inwardly of said terminal edges, between second and third layer elements derived from said second melt stream element, and fourth and fifth elements derived from said third melt stream element, on respective ones of said second and third layer elements, opposite said first layer, said film, as extruded out of said slot die, comprising edge portions having widths extending between said terminal edges and corresponding ones of said edges of said first layer, said edge portions being devoid of said first layer;
   (f) quenching said film; and
   (g) controlling the widths of said edge portions independent of the combined thicknesses of said second and fourth layer elements, by cooperatively setting said second and third flow rates such that said second flow rate controls the widths of said edge portions and such that said third flow rate controls the combined thicknesses of said second and fourth layer elements, between one of said elongate surfaces of said film and said core layer, in light of said second flow rate, whereby (i) the widths of said edge portions, and (ii) the combined thicknesses of said second and fourth layer elements are so separately controlled by the cooperative settings of said second and third flow rates.

3. A method as in claim 2 and including controlling the positioning of all melt streams and in said extruding of said film such that said edge portions consist essentially of material derived from said second melt stream element.

4. A method as in claim 1 and including controlling the positioning of all melt streams and in said extruding of said film such that said edge portions consist essentially of material derived from said second melt stream element.

* * * * *